United States Patent [19]

Tameris

[11] Patent Number: 5,065,671
[45] Date of Patent: Nov. 19, 1991

[54] PLASTIC CHEESE MOLD WITH DRAINAGE SLITS FORMED DURING THE MANUFACTURE OF THE UPRIGHT WALL BY INJECTION MOULDING

[75] Inventor: Hendrikus M. Tameris, Rotterdam, Netherlands

[73] Assignee: Crellin B.V., Rotterdam, Netherlands

[21] Appl. No.: 420,555

[22] Filed: Oct. 11, 1989

[30] Foreign Application Priority Data

Oct. 11, 1988 [NL] Netherlands ............ 8802492

[51] Int. Cl.⁵ .............. A01J 25/13; B29C 33/40; B29C 33/42; B65D 6/34
[52] U.S. Cl. .................. 99/456; 220/675; 220/676; 249/141
[58] Field of Search ........... 99/456, 458, 459; 249/113, 141, 117, 163, 164, 160; 210/498; 100/127, 129; 220/71, 72, 83, 6, 675, 676; 426/512; 425/84, 85, 412; 162/382, 396, 397, 398, 399

[56] References Cited

U.S. PATENT DOCUMENTS

| | | | |
|---|---|---|---|
| 200,392 | 2/1878 | Harlan | 425/84 X |
| 954,220 | 4/1910 | Stewart | 249/160 X |
| 1,503,673 | 8/1924 | Upton | 100/127 |
| 2,910,183 | 10/1959 | Hayes | 210/498 X |
| 3,118,229 | 1/1964 | Rossen | 249/141 X |
| 3,514,857 | 6/1970 | Rossen | 249/141 X |
| 3,628,684 | 12/1971 | Sere | 220/72 X |
| 3,797,980 | 3/1974 | Budahn | 425/84 |
| 3,980,414 | 9/1976 | Shannon et al. | 425/85 |
| 4,238,044 | 12/1980 | Roddier | 220/72 X |
| 4,473,466 | 9/1984 | Schmidt et al. | 210/498 X |
| 4,580,961 | 4/1986 | Jensen | 249/141 X |

FOREIGN PATENT DOCUMENTS

| | | |
|---|---|---|
| 2407583 | 2/1974 | Fed. Rep. of Germany . |
| 2823182 | 12/1978 | Fed. Rep. of Germany . |
| 2909960 | 10/1980 | Fed. Rep. of Germany ...... 249/141 |
| 2036711 | 12/1970 | France .......... 249/141 |
| 2063234 | 7/1971 | France .......... 249/141 |
| 201060 | 2/1963 | Sweden .......... 99/458 |
| 1421528 | 1/1976 | United Kingdom . |
| 2040667A | 9/1980 | United Kingdom . |

OTHER PUBLICATIONS

"Standard Search Report" 2 pages, done on the parent basic Netherlands Application (No. 130819).

Primary Examiner—Harvey C. Hornsby
Assistant Examiner—Scott J. Haugland
Attorney, Agent, or Firm—Weintraub, DuRoss & Brady

[57] ABSTRACT

A rigid rectangular cheese mould (1) comprising a bottom (2) and four upright walls (3) heatsealed to each other in their corners. The walls (3) are provided with outwardly diverging drainage slits (4) during injection moulding of the walls.

The drainage slits (4) form rows (19) extending in the longitudinal direction of the walls, the drainage slits of one row are staggered with respect to the slits (4) of the other row.

The outer side of the cheese mould (1) may be reinforced by reinforcing strips (8) or a reinforcing striplike frame.

The inner surface of the wall (3) is provided with whey discharge recessions (5) forming a net structure resembling a cheese net structure comprising first structure ribs (16) and second structure ribs (17). The first ribs (16) extending in the vertical direction of the wall (3) are higher than the second ribs (17) extending in horizontal direction. The height at the intersection point is the height of the first ribs.

Additional channels 18 on the inner side of wall (3) may connect recesses (5). The net structure is also formed during injection moulding of the walls (3).

Flat walls (3) present the advantage of a simple injection moulding procedure.

15 Claims, 4 Drawing Sheets

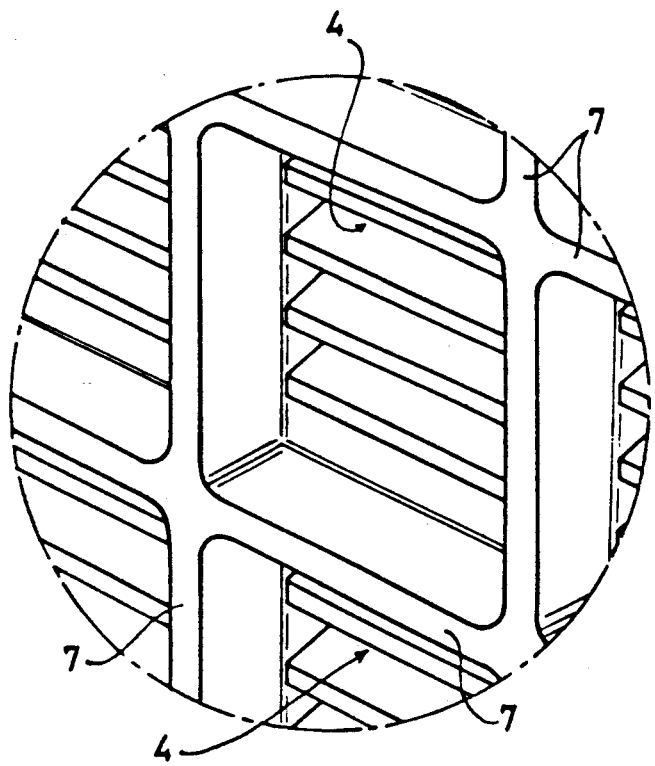
FIG: 2.
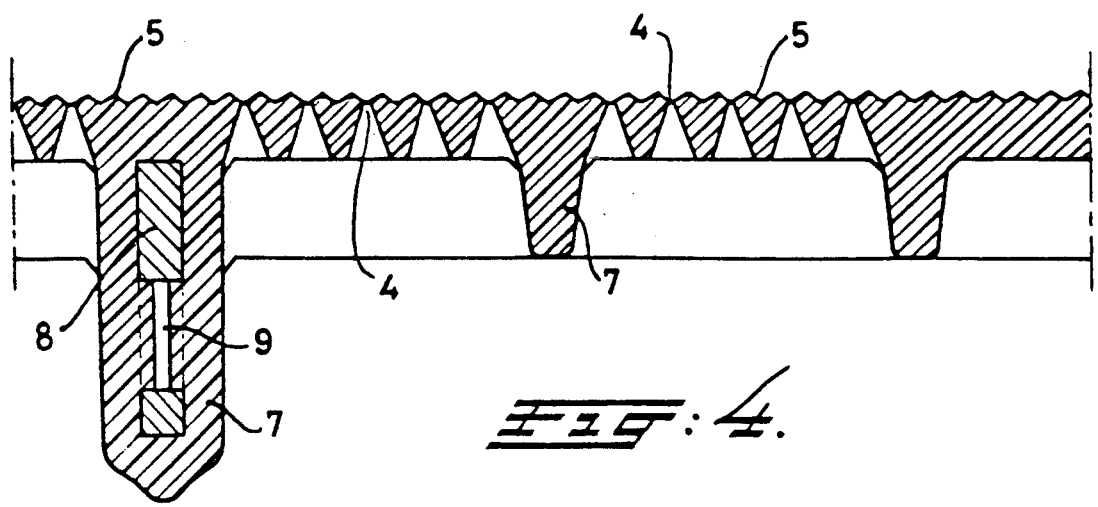
FIG: 4.

PLASTIC CHEESE MOLD WITH DRAINAGE SLITS FORMED DURING THE MANUFACTURE OF THE UPRIGHT WALL BY INJECTION MOULDING

BACKGROUND OF THE INVENTION

The present invention relates to a plastic cheese mold being substantially rigid, comprising a bottom and upright wall(s) provided with drainage slits, and also having on the inner side of the wall whey discharge recesses which open out into said drainage slits.

Such a plastic cheese mold, in which the drainage slits are obtained by mechanical working of the upright wall(s) is known. Due to the mechanical working, such as milling or sawing, these drainage slits may, however, become rough on the inner side. Under those conditions it might occur that curd residues are left behind after cleaning of the cheese mold.

SUMMARY OF THE INVENTION

It is now an object of the invention to provide a plastic cheese mold of the abovementioned type in which this disadvantage does not occur.

This object is achieved according to the invention in that at least the drainage slits are formed during the production of the upright wall(s) by injection molding.

In the formation of the drainage slits during formation of the walls by injection molding very smooth edges are obtained, so that after cleaning, the plastic cheese mold will no longer contain and undesirable curd residues in which undesirable bacteria can multiply and subsequently give rise to undesirable infections in a cheese mold with such a plastic cheese mold.

It is particularly advantageous for the drainage slits to diverge from the inside of the upright walls towards the outside. The drainage slit molding parts disposed in a molding device for forming the drainage slits are consequently easy to remove after the formation of a cheese mold wall. The drainage slits placed in rows lengthwise are expediently disposed staggered relative to each other, viewed in the vertical direction.

A plastic cheese mold according to the invention is preferably made of polyethylene or polypropylene, more particularly of polyethylene.

The whey discharge recesses present on the inner side of the wall of such a plastic cheese mold are also formed during injection molding, these whey discharge recesses expediently forming grooves. A major advantage is also obtained in this way, since the whey discharge grooves present do not have any rough parts like known grooves which are formed by mechanical working of upright walls of a plastic cheese mold formed by injection molding.

It is particularly advantageous for the whey discharge recesses to bound a net structure on the inside wall, thereby making it possible to give a cheese an appearance which is similar to the hitherto known cheeses which are formed using a cheese mold and a plastic net disposed detachably therein. Such a net structure also has the advantage that a very good whey discharge can ensured. Since shrinkage of the plastic after injection molding means that grooves or recesses on the inside wall of such a plastic cheese mold can be considerably reduced, it is advisable for the formation of such grooves or recesses to use a molding device provided with groove-forming or recess-forming elevations which are of greater height than the ultimate depth of the grooves or recesses present in the finished cheese mold.

It is very surprising that very good whey discharge is obtained with such a net structure, preferably a cheese net structure, since in the design known hitherto a cheese molding net lies loose against the inside wall of a cheese mold and is not fused therewith.

The upright walls of the plastic cheese mold expediently carry reinforcement ribs by means of which the forces exerted on the upright walls during the pressing of curds to cheese can be more rapidly absorbed.

The reinforcement ribs expediently extend parallel and/or at right angles to the bottom face. A metal reinforcement strip, which may or may not be circular, is expediently provided in the reinforcement ribs. This reinforcement strip can be provided with through-running holes in order to ensure good anchoring of the reinforcement strip in the plastic. This prevents particularly sagging of the walls during pressing of the curd.

The cheese mold can also be reinforced by means of a surrounding frame of interconnected metal strips.

A plastic cheese mold according to the invention is preferably rectangular and formed by walls which are welded together in the corners. In this way a cheese mold according to the invention can be manufactured with simple moulds, since all that is needed is a mold for forming upright walls, following which in a subsequent separate operation the walls are welded to each other in the corners by mirror or ultrasonic welding. It has been found that in this way a plastic cheese mold being very resistant to the forces exerted on the upright walls during pressing of the curd to cheese can be obtained.

The invention will now be explained with reference to an example of an embodiment shown in the drawing.

BRIEF DESCRIPTION OF THE DRAWINGS

FIG. 2 is a detail of an outside of the wall of a cheese mold according to FIG. 1;

FIG. 3 is a detail of the inner side of the upright wall of a cheese mold according to FIG. 1;

FIG. 3a is a cross-section of a mold in which an upright wall of a cheese mold according to FIG. 1 is formed;

FIG. 4 is a part of a longitudinal section of an upright wall of a cheese mold according to the invention;

FIG. 1 shows a cheese mold 1 of plastic, particularly polyethylene, comprising four upright walls 3 which together bound a rectangular cheese mold.

DETAILED DESCRIPTION OF THE PREFERRED EMBODIMENTS

Figure 1:
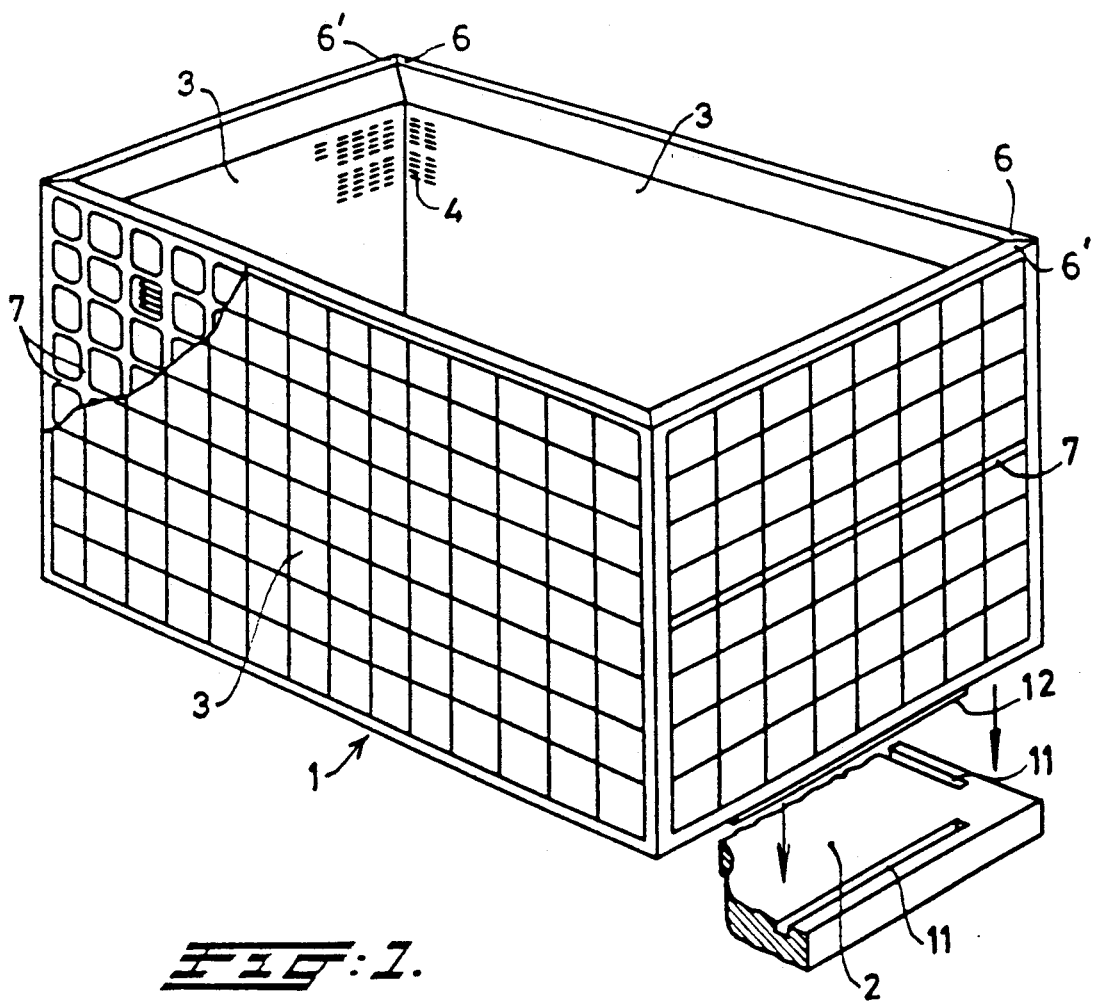
FIG. 1 shows a cheese mold according to the invention.
Figure 6:
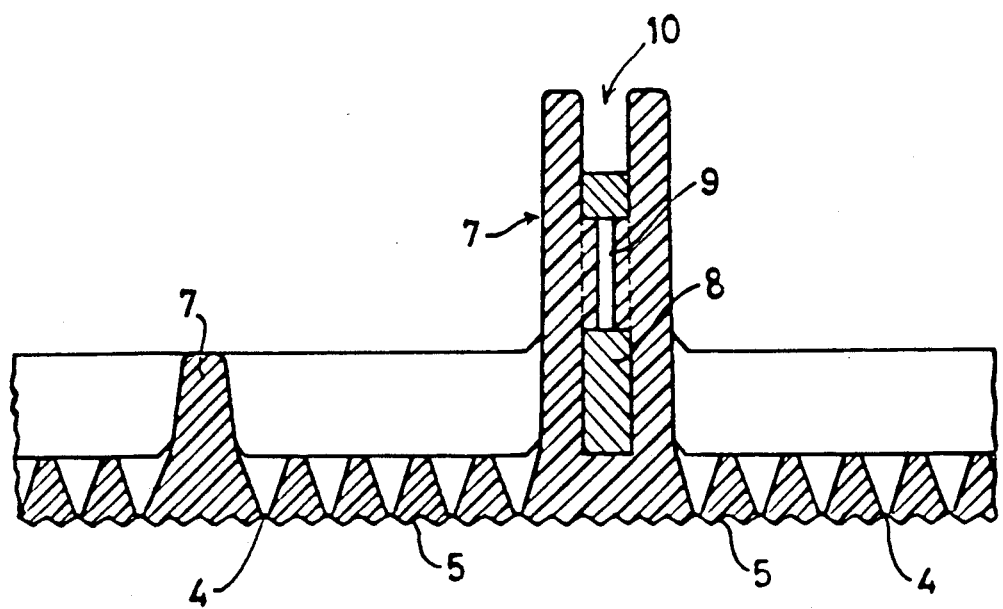
FIG. 6 is a part of a longitudinal section of an upright wall of a cheese mold provided with a metal reinforcement strip.
Figure 5A:
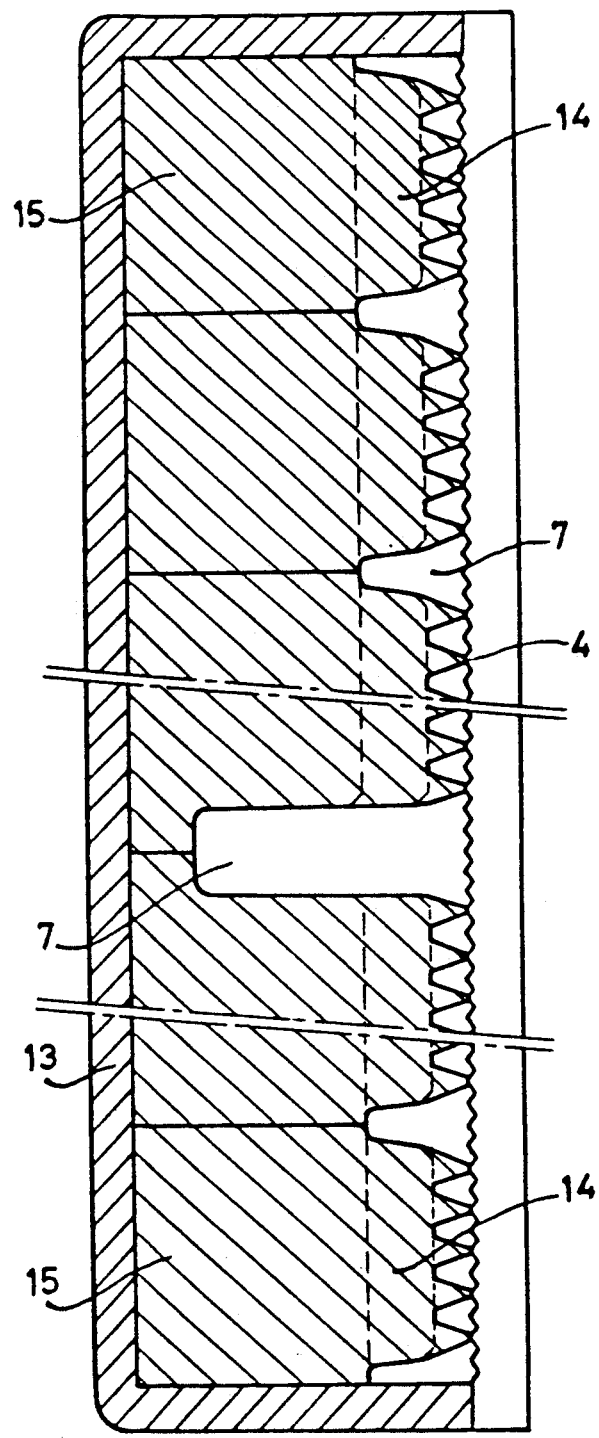
FIG. 5 is a detail of the wall of whey discharge recesses which form a cheese net structure formed by injection molding.
Figure 5:
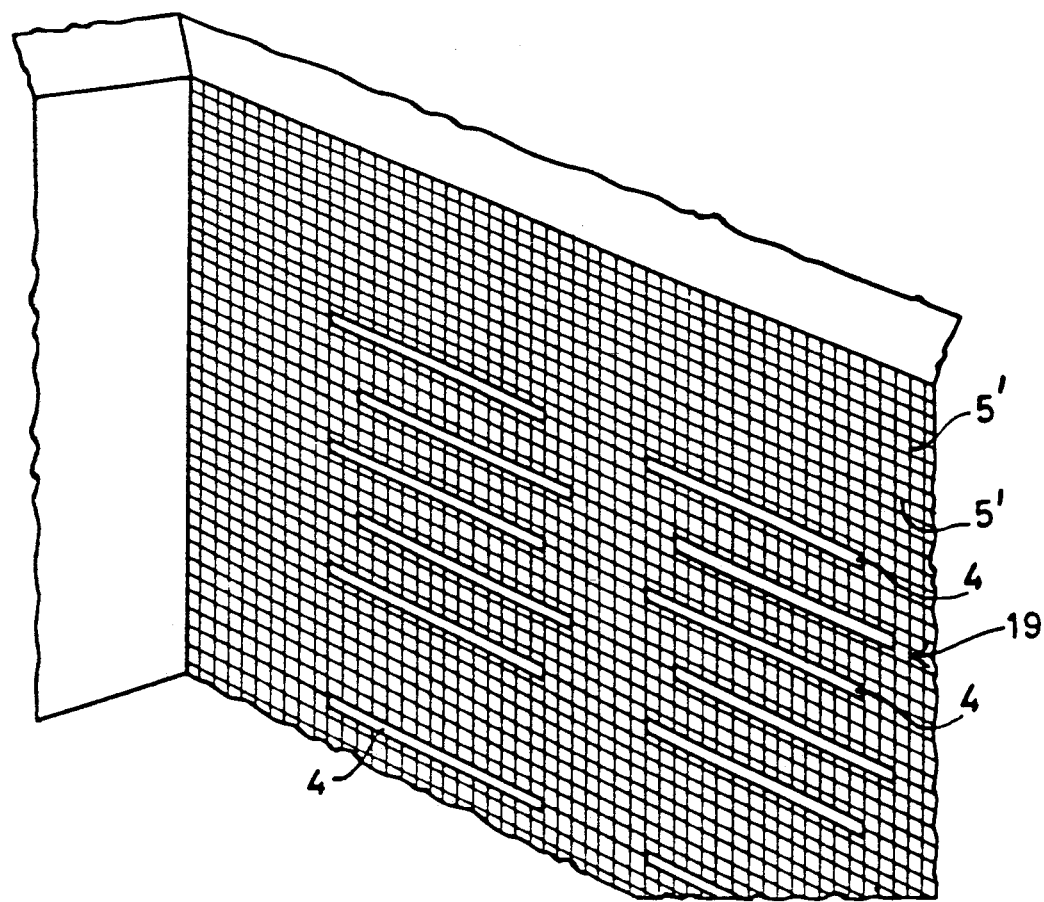
Figure 6:
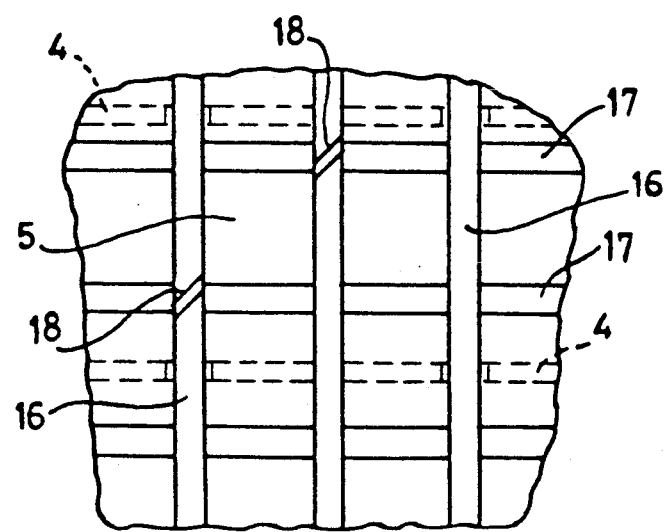

The upright walls 3, which are always joined together at their corners 6, 6' e.g. by ultrasonic welding and thereby form a rectangular cheese mold, can be joined to a bottom 2, provided with connecting grooves 11 which can contain connecting ribs 12 located on the bottom side of each upright walls 3. The corners are beveled in order to permit good engagement, preferably welding together, of the corners of the upright walls 3.

The use of separate upstanding walls to be heatsealed to each other is very advantageous as now only flat wall parts have to be injection molded thereby avoiding the application of complicated molding devices. Moreover walls 3 of appropriate size may be separated from an in one step injection molded part of greater size.

The upright walls 3 are provided with drainage holes in the form of drainage slits 4 during the injection molding of the walls. In order to ensure that after injection molding of the cheese mold in a molding device 13 the molding device shaping parts 14 for shaping the grooves 4 can be removed easily from the finished wall 3, the drainage slits 4 and the mold shaping parts 14 diverge to the outside.

The drainage slits 4 are expediently disposed in rows 19 running in the lengthwise direction of the walls 3, the drainage slits 4 of one row being staggered relative to the row above.

In order to obtain a cheese mold which is resistant to the great forces being exerted during pressing of the curd to a cheese in such a cheese mold, the walls 3 are provided on the outside with reinforcement ribs 7 extending both at right angles and parallel to the bottom 2. For this the molding device 13 is provided with molding blocks 15 which are integral with the molding device shaping parts 14.

For further reinforcement, it is possible during injection molding of the cheese mold to provide a reinforcement rib 7 with a recess 10 in which a metal reinforcement strip 8, expediently provided with through-running holes 9, can be fitted after removal from the molding device. Heat-sealing the aperture 10 after fitting of the metal reinforcement strip 8 means that a cheese mold with reinforcement ribs 7 which are additionally reinforced by a metal reinforcement strip 8 is obtained. Through heating of the plastic it can be ensured that in the finished product the plastic extends through the holes 9 of the metal reinforcement strip 8.

In a very convenient embodiment the cheese mold is reinforced by surrounding same with a metal reinforcing frame, such as formed by interconnected metal strips.

In case of surrounding reinforcements it is even possible not to interconnect the walls of the cheese mold by heat sealing and to leave the walls loose with respect to each other.

The inside of the upright walls is expediently provided with whey discharge recesses 5' which are formed during the injection molding, and which open out into drainage slits 4.

It is particularly advantageous for the cheese mold to have on the inside wall whey discharge recesses 5 which together form a net structure 6, preferably a cheese net structure, formed by injection molding. This net structure is formed by first structure ribs 16 running in the vertical direction of the upright walls 3 and second structure ribs 17 running in the lengthwise direction of the upright walls 3.

In certain cases it can be advisable during the injection molding to form additional channels 18 on the inner side of the wall which connect the whey discharge recesses 5, the openings which in the known cheese mold were bounded by the threads of a detachable cheese net.

In order to facilitate the removal of a pressed cheese from such a cheese mold, the first structure ribs 16 are expediently made higher than the second structure ribs 17. At the points of intersection the ribs have the height of the first structure ribs 16.

It goes without saying that the bottom 2 can be screwed to the unit formed by the walls and that the walls 3 may also be screwed to each other in the corners.

What is claimed is:

1. A substantially rigid plastic cheese mold, comprising:
   at least one upright injection molded plastic wall, the wall being substantially rigid and having an inner side and an outer side and having drainage slits formed therethrough,
   the wall further having whey discharge recesses formed therein which open into the drainage slits,
   the drainage slits having substantially smooth injection molded surfaces which diverge outwardly from the inner side to the outer side of the wall, the drainage slits further being disposed in rows which are staggered relative to each other, as seen in the vertical direction.

2. The cheese mold of claim 1, wherein the inner side of the wall defines a net structure which comprises the whey discharge recesses, and wherein the net structure further comprises first structure ribs running in the vertical direction of the upright wall, and second structure ribs running in the horizontal direction of the wall.

3. The cheese mold according to claim 2, wherein the first structure ribs of said net are thicker than the second structure ribs of said net.

4. The cheese mold according to claim 1, further comprising channels connecting the whey discharge recesses, the channels formed by injection molding.

5. The cheese mold according to claim 1, wherein the drainage holes (4) are drainage slits formed in the walls.

6. The cheese mold according to claim 1, wherein the inner side of the wall defines a net structure which comprises the whey discharge recesses, the wall being a product of a process which comprises injection molding.

7. The cheese mold according to claim 1, wherein the cheese mold is angular in cross section, and is formed by upright injection-molded wall parts engaging each other at edges thereof and connected to each other by welding.

8. The cheese mold according to claim 1, wherein the outerside of the upright wall further comprises at least one reinforcement rib, the reinforcement rib extending parallel to the circumference of the mold.

9. The cheese mold according to claim 8, further comprising a reinforcement strip; and,
   a recess located in the reinforcement rib.

10. The cheese mold according to claim 9, wherein the reinforcement strip is sealed within the recess.

11. The cheese mold according to claim 1, wherein the cheese mold further comprises at least one reinforcing strip.

12. A substantially rigid plastic cheese mold, comprising:
    at least one upright injection molded plastic wall, the wall being substantially rigid and having an inner side and an outer side and having drainage holes formed therethrough, the wall further having whey discharge recesses formed therein which open into the drainage holes, the drainage holes having substantially smooth injection molded surfaces; the outer side of the wall comprising at least one reinforcement rib; and a metal reinforcement strip having through holes formed therethrough, the reinforcement strip being embedded in the reinforcement rib.

13. The cheese mold according to claim 12, wherein the outer side of the upright wall further comprises a plurality of reinforcement ribs which are perpendicular to the bottom of the wall.

14. The cheese mold according to claim 1, further comprising a bottom panel which is attached to the upright wall.

15. The cheese mold of claim 1, wherein the drainage slits diverge outwardly from the inner side to the outer side of the wall.

* * * * *